United States Patent
Ghosh et al.

(10) Patent No.: US 9,760,896 B2
(45) Date of Patent: Sep. 12, 2017

(54) ACQUIRING CUSTOMER INSIGHT IN A RETAIL ENVIRONMENT

(75) Inventors: Riddhiman Ghosh, Sunnyvale, CA (US); Jhilmil Jain, Sunnyvale, CA (US); Mohamed E. Dekhil, Santa Clara, CA (US)

(73) Assignee: EntIT Software LLC, Sunnyvale, CA (US)

( * ) Notice: Subject to any disclaimer, the term of this patent is extended or adjusted under 35 U.S.C. 154(b) by 140 days.

(21) Appl. No.: 12/906,739

(22) Filed: Oct. 18, 2010

(65) Prior Publication Data

US 2012/0095805 A1 Apr. 19, 2012

(51) Int. Cl.
*G06Q 30/02* (2012.01)

(52) U.S. Cl.
CPC ..... *G06Q 30/0201* (2013.01); *G06Q 30/0205* (2013.01); *G06Q 30/0261* (2013.01); *G06Q 30/0281* (2013.01)

(58) Field of Classification Search
CPC ............ G06C 30/0201; G06C 30/0281; G06C 30/0261
See application file for complete search history.

(56) References Cited

U.S. PATENT DOCUMENTS

| | | | |
|---|---|---|---|
| 5,237,157 A * | 8/1993 | Kaplan | G06Q 30/02 235/375 |
| 5,821,513 A * | 10/1998 | O'Hagan et al. | 235/383 |
| 6,119,935 A * | 9/2000 | Jelen et al. | 235/383 |
| 6,507,279 B2 | 1/2003 | Loof | |
| 6,587,835 B1 * | 7/2003 | Treyz et al. | 705/14.64 |
| 6,616,049 B1 * | 9/2003 | Barkan et al. | 235/472.03 |
| 6,684,195 B1 * | 1/2004 | Deaton et al. | 705/14.13 |
| 6,774,765 B1 * | 8/2004 | Goodwin, III | 340/7.28 |
| 7,076,441 B2 * | 7/2006 | Hind et al. | 705/7.29 |
| 7,240,834 B2 | 7/2007 | Kato et al. | |
| 7,407,099 B1 * | 8/2008 | Bhatti et al. | 235/385 |
| 7,658,327 B2 | 2/2010 | Tuchman et al. | |
| 7,743,395 B2 * | 6/2010 | Hirt et al. | 725/35 |
| 7,756,755 B2 | 7/2010 | Ghosh et al. | |
| 7,848,566 B2 * | 12/2010 | Schneiderman | 382/159 |
| 7,853,477 B2 * | 12/2010 | O'Shea et al. | 705/14.1 |
| 7,899,698 B2 * | 3/2011 | Wan et al. | 705/7.38 |
| 7,962,361 B2 * | 6/2011 | Ramchandani et al. | 705/14.25 |

(Continued)

OTHER PUBLICATIONS

Ghosh, Riddhiman, et al., "Brickstreams: Physical Hypermedia Driven Customer Insight," Proceedings of the 21st ACM Conference on Hypertext and Hypermedia, Jun. 13-16, 2010, Toronto, Ontario, Canada, pp. 283-284.

*Primary Examiner* — Susanna M Meinecke Diaz
*Assistant Examiner* — George H Walker, III

(57) ABSTRACT

The present disclosure provides a computer-implemented method of acquiring customer insight information in a retail environment. The method includes receiving a product interaction from a mobile device, the product interaction comprising a product identifier corresponding to a product located in the retail environment. The method also includes determining a customer location within the retail environment based on a planned location of the product. The method also includes performing a business action based, at least in part, on the product interaction. The method also includes storing customer insight information corresponding to the product interaction to a data structure.

20 Claims, 4 Drawing Sheets

(56) References Cited

U.S. PATENT DOCUMENTS

| | | | |
|---|---|---|---|
| 8,207,851 B2* | 6/2012 | Christopher | 340/568.1 |
| 2002/0002485 A1* | 1/2002 | O'Brien et al. | 705/14 |
| 2002/0004753 A1* | 1/2002 | Perkowski | 705/26 |
| 2002/0116266 A1* | 8/2002 | Marshall | 705/14 |
| 2002/0161651 A1* | 10/2002 | Godsey et al. | 705/22 |
| 2002/0165758 A1* | 11/2002 | Hind et al. | 705/10 |
| 2003/0126095 A1* | 7/2003 | Allen | 705/80 |
| 2003/0132298 A1* | 7/2003 | Swartz et al. | 235/472.02 |
| 2003/0158796 A1* | 8/2003 | Balent | 705/28 |
| 2003/0182266 A1* | 9/2003 | Stern | 707/1 |
| 2003/0195812 A1* | 10/2003 | Nguyen | 705/26 |
| 2004/0078209 A1* | 4/2004 | Thomson | 705/1 |
| 2004/0093265 A1* | 5/2004 | Ramchandani et al. | 705/14 |
| 2004/0103034 A1* | 5/2004 | Reade et al. | 705/16 |
| 2004/0181461 A1* | 9/2004 | Raiyani et al. | 705/26 |
| 2005/0040230 A1* | 2/2005 | Swartz et al. | 235/383 |
| 2005/0049914 A1* | 3/2005 | Parish | 705/14 |
| 2005/0149391 A1* | 7/2005 | O'Shea et al. | 705/14 |
| 2005/0154646 A1* | 7/2005 | Chermesino | 705/26 |
| 2005/0234771 A1* | 10/2005 | Register et al. | 705/14 |
| 2006/0015892 A1* | 1/2006 | Hirt et al. | 725/10 |
| 2006/0065716 A1* | 3/2006 | Peters | 235/380 |
| 2006/0101497 A1* | 5/2006 | Hirt et al. | 725/81 |
| 2006/0289637 A1* | 12/2006 | Brice | G06Q 10/087 235/385 |
| 2007/0050235 A1* | 3/2007 | Ouimet | G06Q 10/06375 705/7.31 |
| 2007/0055563 A1* | 3/2007 | Godsey et al. | 705/10 |
| 2007/0067220 A1* | 3/2007 | Godsey et al. | 705/23 |
| 2007/0067221 A1* | 3/2007 | Godsey et al. | 705/23 |
| 2007/0067222 A1* | 3/2007 | Godsey et al. | 705/23 |
| 2008/0004950 A1* | 1/2008 | Huang et al. | 705/14 |
| 2008/0042836 A1* | 2/2008 | Christopher | 340/568.1 |
| 2008/0059297 A1* | 3/2008 | Vallier et al. | 705/14 |
| 2008/0153513 A1* | 6/2008 | Flake et al. | 455/456.3 |
| 2009/0006196 A1* | 1/2009 | Barkan et al. | 705/14 |
| 2009/0012704 A1* | 1/2009 | Franco | G01C 21/20 701/532 |
| 2009/0015374 A1 | 1/2009 | Ghosh | |
| 2009/0106085 A1 | 4/2009 | Raimbeault | |
| 2009/0285483 A1 | 11/2009 | Guven et al. | |
| 2009/0298483 A1* | 12/2009 | Bratu et al. | 455/414.2 |
| 2010/0070369 A1* | 3/2010 | Fenton | G06Q 20/3224 705/14.58 |
| 2010/0121807 A1* | 5/2010 | Perrier | G06N 5/02 706/47 |
| 2010/0222041 A1* | 9/2010 | Dragt | 455/414.2 |
| 2011/0029342 A1* | 2/2011 | Wolinsky | G06Q 30/02 705/7.29 |
| 2011/0029360 A1* | 2/2011 | Gollapalli | G06Q 30/02 705/14.1 |
| 2011/0029997 A1* | 2/2011 | Wolinsky | G06Q 30/02 725/12 |
| 2011/0040655 A1* | 2/2011 | Hendrickson | 705/27.1 |
| 2011/0055005 A1* | 3/2011 | Lang | 705/14.45 |
| 2011/0178862 A1* | 7/2011 | Daigle | G06Q 30/0226 705/14.27 |
| 2011/0196724 A1* | 8/2011 | Fenton | G06Q 20/108 705/14.16 |
| 2011/0270618 A1* | 11/2011 | Banerjee et al. | 705/1.1 |

* cited by examiner

300

ACQUIRING CUSTOMER INSIGHT IN A RETAIL ENVIRONMENT

BACKGROUND

Insight into customer interests and buying habits is an important tool for enabling retailers to compete in the modern marketplace. In an on-line environment, retailers are able to use clickstream data to track customer interactions to determine buying habits of customers. By analyzing clickstream data, on-line retailers can readily identify product purchases, products in which customers have shown an interest, special offers that customers have exploited in making purchases, and the like. Retailers can use this information to better tailor marketing campaigns and product offerings to suit the interests of consumers.

In a traditional brick-and-mortar retail store, insight into customer interests is harder to obtain. Brick-and-mortar retailers can analyze point-of-sale transactions after purchases are completed. However, point-of-sale transactions do not provide information regarding customer behavior before an actual purchase took place.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Embodiments provide a system for acquiring customer insight in a brick-and-mortar retail environment. A customer insight system in accordance with embodiments enables the analysis of customer behavior that occurs prior to a purchase transaction. For example, the customer insight system can be used to identify offers or products for which a customer showed interest prior to a purchase or in the absence of a purchase. The customer insight system can be used to identify information, such as product reviews, that a customer accessed to inform a possible purchase decision. In embodiments, the customer insight system can be used to track customer location and foot traffic within the retail environment. Additionally, the customer insight system can be used to initiate personalized customer interactions such as targeted advertising and product offers, product information, customer assistance, and the like. The personalized customer interactions can be initiated by the customer or initiated based on analysis of the customer information collected by the customer insight system.

Figure 1:
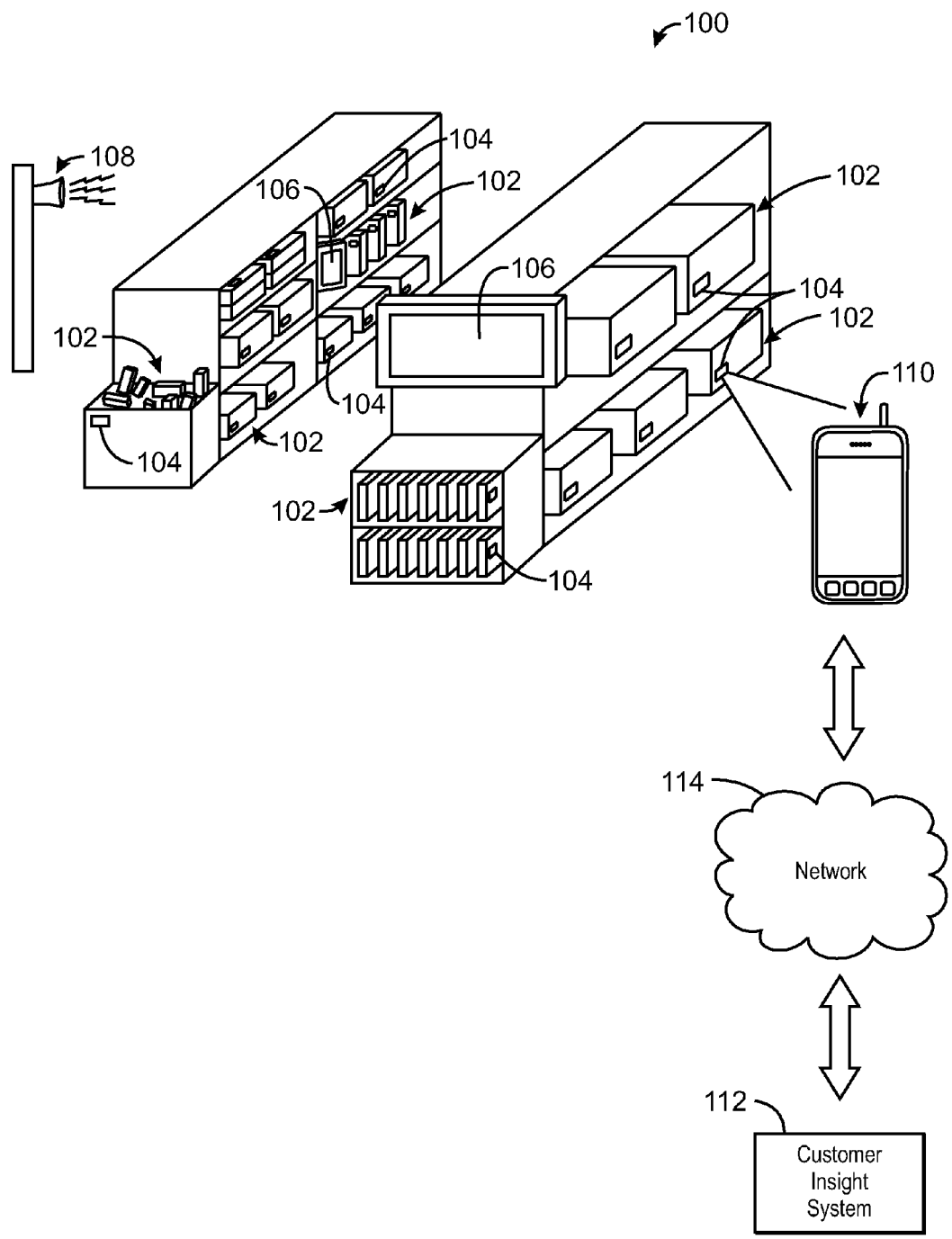
FIG. 1 is a perspective view of a retail environment that includes a customer insight system, in accordance with embodiments.

FIG. 1 is a perspective view of a retail environment that includes a customer insight system, in accordance with embodiments. The retail environment 100 can include a plurality of products 102 associated with product identification tags 104 that can be used to electronically identify the corresponding product 102. The product identification tags 104 can include printed labels, such as bar codes, quick response (QR) bar codes, and/or high-capacity color bar (HCCB) codes, among others. The product identification tags 104 can also include electronic tags such as radio frequency identification (RFID) tags, and the like. Product identification tags 104 associated with a product 102 may be affixed, for example, directly to product packaging or to a nearby display of product information, for example, on a display case or product shelving. The location of products within the retail environment can be determined according to a store planogram that indicates how and where certain retail products are to be displayed. The product identification tags 104 may encode information about the tagged product by reference or by value. For example, if the product identification tag 104 encodes information reference, the tag may include a unique product identifier that can be used by the customer insight system to look up additional product information. If the product identification tags 104 encodes information by value, the tag itself can include a variety of product information, including the unique product identifier, relation to the store planogram, product specifications, product offers and discounts, product reviews, expert advice, and the like.

The retail environment 100 can also include various forms of advertising media, for example, displays 106, and an audio system 108. The displays 106 can be configured to play a variety of media content, including still images, video, audio, and the like. For example, the displays 106 can include flat panel televisions. The displays 106 may also include LED signs configured, for example, to display scrolling text. The displays 106 can be used to provide advertising messages to shoppers, including targeted advertising based on customer interests, and customer location within the retail environment, among others. The advertising messages chosen for display at a particular location can be determined based on foot traffic within the retail environment 100, user interest in specific products, user profiles, and the like. The audio system 108 can be used to make announcements directed to shoppers, such as product offers, and the like.

The customer can use a mobile device 110 to acquire information about products by scanning a corresponding product identification tag 104. As used herein, the term "mobile device" refers to a personal mobile device possessed by the customer such as the customer's mobile phone, smart phone, personal digital assistant (PDA), and the like. A variety of techniques may be used to scan product tags. A camera on the mobile device 110 may be used to capture an image of the product identification tag 104, which may be a bar code, for example. The mobile device 110 can then convert the image of the product identification tag 104 into a product identifier that uniquely identifies the product. In some embodiments, the mobile device 110 may include a laser scanner, configured to scan bar codes. In some embodiments, the mobile device 110 includes an electronic device configured to communicate electronically with product tags 104. For example, the mobile device 110 can include an RFID tag reader, a Near Field Communication (NFC) device, and the like. The act of scanning a product identification tag 104 can also include the user manually entering a product code displayed on the product 102 or product identification tag 104. The scanning of a particular product identification tag 104 by the customer is referred to herein as a type of product interaction. Other product interactions can include specific customer requests with regard to a product such as a request for product information, product reviews, customer assistance, and the like.

The mobile device 110 may communicate the contents of the product identification tag 104 to a customer insight system 112 through a network 114. As described further below, the mobile device 110 can also communicate additional information to the customer insight system 112 such as user identity and user profile information. The network 114 can be any suitable type of wireless communications network, including a WiFi network, for example, based on the IEEE 802.11 standards, or a cellular general packet radio service (GPRS) network, among others. The customer insight system 112 resolves a particular product identification tag 104 to identify content or business actions corresponding to the product, such as product offers, advertising media, and the like. Each product interaction can be used to determine a business action to be performed by the customer insight system 112, for example, sending a set of product-related content to the customer's mobile device 110, initiating in-store advertising, and the like.

The customer's interaction with a product identification tag 104 can also be used to determine the customer's location within the retail environment 100. The customer insight system 112 can compare the product identification obtained from the product identification tag 104 against the store planogram (product map) to accurately identify user location within the retail environment 100. This provides an advantage over traditional locating techniques such as global position systems (GPS) and cellular triangulation, which do not perform well in typical retail environments due to the lack of sufficient resolution and shadowing or interference with the line-of-sight signals used in such technology. The location of the customer can be used to provide targeted, in-store advertising and customer assistance. Location information can also be aggregated over multiple users and analyzed to determine in-store traffic, store hot-spots, customer interest trending, and the like, to a greater level of accuracy than using only point-of-sale data.

The customer insight system 112 can be used to initiate various business actions based on the customer interactions with specific products. Business actions can be directed to a specific customer in response to a product interaction of that customer. For example, upon receiving a product interaction, the customer insight system 112 can send product related information to the customer's mobile device 110. Business actions can also be based on the recent product interactions of a plurality of customers. For example, the customer insight system 112 may evaluate a plurality of recent product interactions of several customers to select advertising content to be displayed on one or more displays 106 or select an announcement to be played over the audio system 108. Information from a user's profile, his location in the store at that instant of time, the relative location of in-store traffic at that instant of time, recent product interactions, customer requests, and business rules may be taken into account to determine the business action. The customer insight system 112 can log each product interaction to build a knowledge base about the customer. This knowledge base can be used to provide personalized content to the customer based on the known interests and purchasing habits of the customer. The knowledge base can also be used to determine a retailing strategy based on the knowledge acquired from several customers. Embodiments of the customer insight system 112 may be better understood with reference to FIG. 2, described below.

Figure 2:
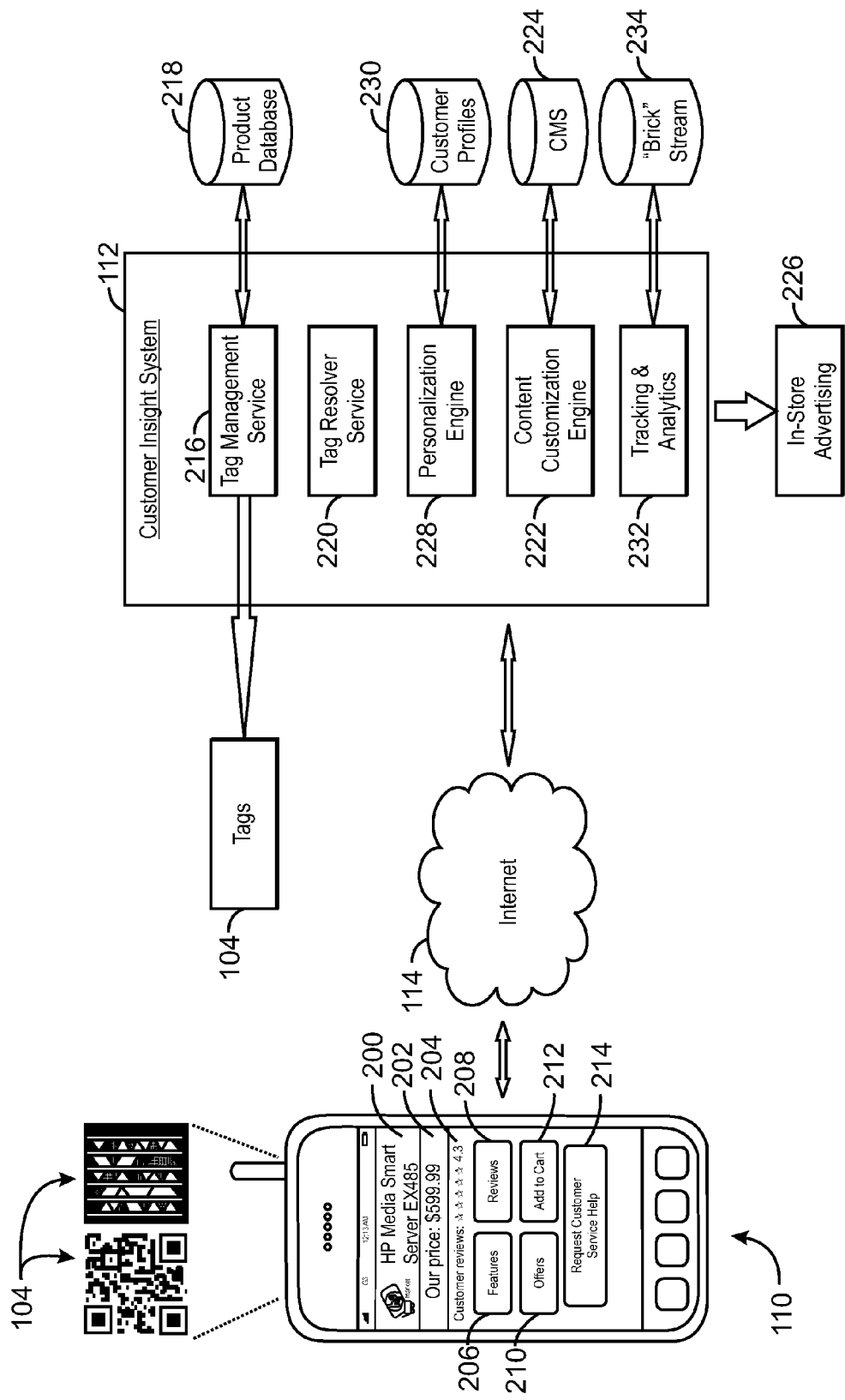
FIG. 2 is a block diagram of a customer insight system, in accordance with embodiments.

FIG. 2 is a block diagram of a customer insight system, in accordance with embodiments. Those of ordinary skill in the art will appreciate that the functional blocks and devices shown in FIG. 2 may comprise hardware elements including circuitry, software elements including computer code stored on a non-transitory, computer-readable medium, or a combination of both hardware and software elements. In embodiments, the customer insight system 112 may be implemented on server located at the retail store or at a remote location such as a corporate headquarters, for example. In embodiments, the customer insight system 112 is operated as a cloud computing system. Furthermore, the configuration is not limited to that shown in FIG. 1, as any number of functional blocks and devices may be used in various embodiments. Those of ordinary skill in the art would readily be able to define specific functional blocks based on design considerations for a particular system.

As described above in relation to FIG. 1, the customer insight system 112 may be communicatively coupled to the customer's personal mobile device 110 through the network 114. In embodiments, the mobile device 110 includes a specialized application that enables the mobile device to interact with the customer insight system 112. For example, the application can include a feature that enables the mobile device 110 to acquire the product tag information, such as image processing feature that can identify bar codes using an image captured by the mobile device's camera. The application can also enable the mobile device 110 to connect to the network, for example, by providing a security code, encryption key, and the like. Information received from the customer insight system 112 can be processed by the application and rendered on a display of the mobile device 110, for example, through a graphical user interface (GUI). In some embodiments, an initial option menu provides basic information about the product 102, such as a name of the product 200, product pricing 202, overall customer review rating 204, and the like. The initial option menu may also provide menu options that enable the user to obtain more detailed information, such as product specification 206, consumer reviews 208, and offers 210 related to the product, such as personalized pricing discounts, among others. In embodiments, the user can also select an option 212 for adding the product to virtual shopping cart. The virtual shopping cart can be used to identify products that the customer intends to purchase, or would like to purchase in the future. In embodiments, the customer can also select an option 214 for requesting customer service. The request for customer service can be sent to the customer insight system 112, which then uses the location information to dispatch a customer service agent to the customer location within the retail environment.

The customer insight system 112 can include a tag management service 216 used to generate the product tags 104. The tag management service 216 can be operatively coupled to a product database 218 that includes product information for each product in the store's inventory. The product database 218 can include information for each product, such as product pricing, product features and specifications, product offer information, and the like. Some or all of the product information stored to the product database 218 can be incorporated by the tag management service 216 into the corresponding product identification tag 104, depending on the type of product identification tag 104 used in a particular implementation. For example, if the product identification tag 104 is an RFID or NFC tag, the tag management service 216 can generate tags with several kilobytes of data, including product descriptions, product offers, product images, and the like. In embodiments, the tag management service 216 generates product identification tags 104 that include only a product identifier. The tag management system 216 may be used to periodically update tag information, for example, as new products are brought into inventory, products are discontinued, or new product information such as new product offers become available. Product identification tag 104 generated by the tag management service 216 can be affixed to the products by store personnel.

The customer insight system 112 can include a tag resolver service 220 that associates tag information received from the mobile device 110 with a digital representation of the corresponding product. For example, the tag resolver service 220 can receive a bar code or bar code image from the mobile device 110 and generate a corresponding product identifier used by the customer insight system 112.

The customer insight system 112 can include a content customization engine 222 that can receive the product identifier generated by the tag resolver service 220 and determine content to be delivered to the mobile device 110 or identify a business action to be performed. The content customization engine 222 can be operatively coupled to a content management system 224 that stores the product related content. Product related content can include product reviews, expert advice, product specifications, a store planogram, and the like. Product related content can also include advertisements related to the product, such as multimedia files that can be rendered on the customer's mobile device 110. Product related content can also include product offers, such as pricing discounts, coupons, and the like. The content customization engine 222 may identify specific product information to send to the mobile device 112 based on the product identifier and/or a specific customer request received from the mobile device 110, for example, a request for product reviews, specifications, and the like.

In embodiments, the content customization engine 222 is configured to determine the location of the customer within the retail environment. For example, the content customization engine 222 can identify the customer location by cross-referencing the product identifier with the store planogram to identify the planned location of the product corresponding to the product interaction initiated by the customer. The customer location information can be used by the content customization engine 222 to assist in the determination of the appropriate business action to take in response to the product interaction. For example, the content customization engine 222 may be configured to alert an in-store customer service agent regarding a request for customer service received from a particular mobile device 112. The content customization engine 222 can use the customer location information to dispatch the customer service agent to the proper location.

In embodiments, the content customization engine 222 is configured to provide advertising content to an in-store advertising system 226, for example, the displays 106 or the audio system 108 (FIG. 1). The in-store advertising can be based on product interactions of individual customers. For example, the content customization engine 222 may determine that a particular customer is interested in a particular product based on a product interaction, which may include a scan of the product, a request for product reviews, or other product related information. The content customization engine 222 can also render product-related advertising media to a display 106 in the vicinity of the particular customer. The in-store advertising can also be based on product interactions of a plurality of customers. For example, the content customization engine 222 may determine that several customers are interested in a particular product based on having received several product interactions for the same product. The content customization engine 222 may then provide product-related audio media to the audio system 108 highlighting benefits of the product or present product offers such as price discounts, for example.

The customer insight system 112 can also include a personalization engine 228 that manages information regarding specific customers and enables the retailer to provide a more personalized shopping experience. In embodiments, the user profile can include personal information provided by the customer. The customer may be prompted to provide certain information as a condition for using the customer insight system 112. Such information may be gathered as part of a service registration process conducted when the user downloads the mobile device application. For example, the customer may be requested to provide a mailing address, billing information, contact information, and the like. The customer may also be requested to provide information regarding personal preferences, demographic information, and the like. For example, the user may be provided with a questionnaire that asks the customer indicate brand preferences, product preferences, age, income level, occupation, and the like.

The user profile may include previous product interactions of the customer as well as derivative information such as the customer's likes and dislikes. For example, previous purchases by the customer can be used to determine that the user tends to favor particular brands or manufacturers, and this information can be stored to the user profile. The user profile may also include information acquired through an online customer account registered through a Website provided by the retailer. In this way, online purchases and activity of the customer can be added to in-store activity, providing a fuller picture of the customers shopping habits.

In embodiments, the user profile is stored to the user's mobile device and communicated to the customer insight system 112 when a product is scanned. In this way, the user can control the content of the information sent to the customer insight system 112. For example, the user's mobile device may provide an option that enables the customer to block the transmission of a user profile or allow only selected types of information to be transmitted such as the customer's brand preferences. In some embodiments, the user profiles are stored by the personalization engine 228 to a customer profile database 230. To obtain the user profile from the customer profile database 230, the mobile device 110 may send a user identification to the customer insight system 112 when a product is scanned. The user identification can then be used to obtain the corresponding customer profile from the customer profile database 230. In an embodiment, the customer identification is a unique identifier that preserves the anonymity of the user. In other words, the customer identification can enable the customer insight system 112 to track the buying habits of an individual customer without knowing the actual identity of the customer. In an embodiment, the customer identification can enable the customer insight system 112 to obtain personal information provided by the customer and stored to the customer profile database 230, including name, address, billing information, contact information, and the like.

When the customer initiates a product interaction, the content customization engine 222 can identify specific product information to send to the mobile device 112 based, in part, on knowledge about the customer provided by the personalization engine 228. For example, the content customization engine 222 may send a welcome message to the mobile device 110 that includes the customer's name. The content customization engine 222 may also alert the customer regarding a price discount available for a specific product in which the user has shown a previous interest, which may be determined based on a previous product scan, request for reviews, addition of the item to the user's shopping cart, and the like.

The customer insight system 112 can also include a tracking and analytics engine 232 that performs analysis on data gathered by the customer insight system 112. Each product interaction can be stored by the tracking and analytics engine 232 to a database, referred to herein as a "brickstream" database 234. The types of product interactions obtained through the customer insight system 112 provide a more detailed and informative view of customer shopping habits than can be obtained through a system that only includes point-of-purchase data. For example, the brickstream data can be analyzed to identify products that customers were interested in but didn't purchase. The brickstream data can also be analyzed to identify product offers that users redeemed or were interested in but chose not to redeem. The brickstream data can also be analyzed to identify the types of information requested by customers to inform their purchasing decisions. The tracking and analytics engine 232 can also be used to analyze foot traffic within the retail environment based on the combined location information and user profile information of individual customers. For example, the brickstream data may be used to determine how many people are in the store during certain periods of the day, the demographic characteristics of customers and how those demographics vary for throughout the day, the length of time customer remain in the store, what products the customers interacted in, and the like. The analysis of the brickstream data may be used, for example, to alter product pricing or to design a marketing campaign with regard to certain products.

Figure 3:
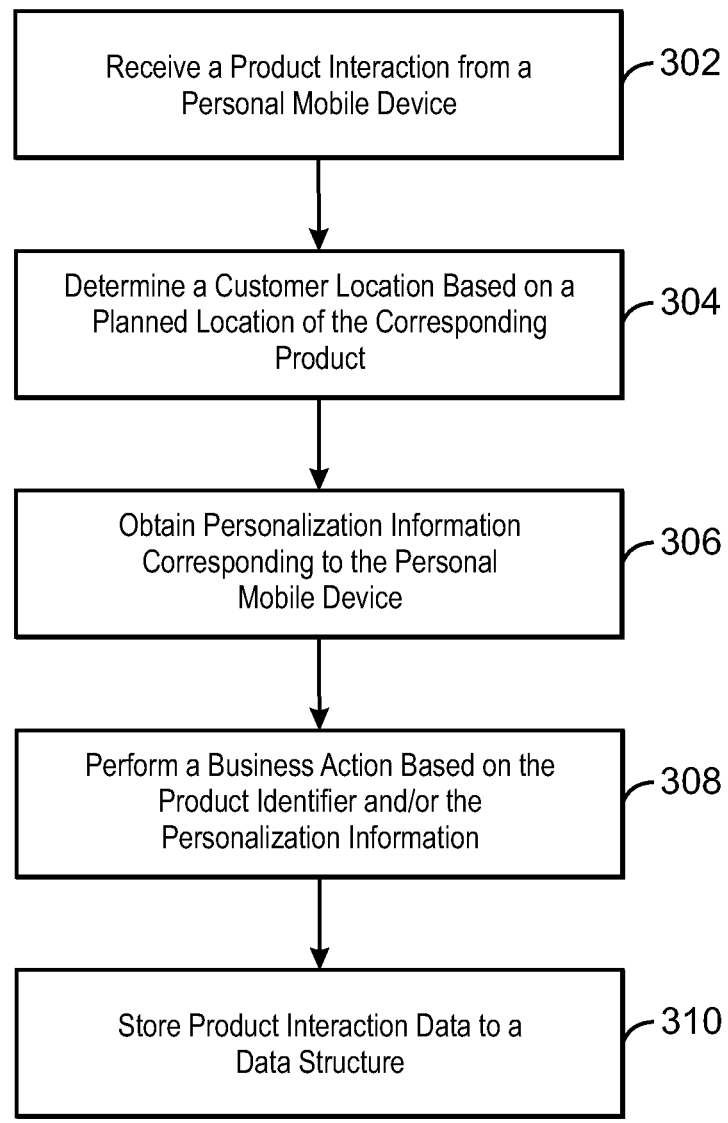
FIG. 3 is a process flow diagram of a method of acquiring customer insight in a retail environment, in accordance with embodiments.

FIG. 3 is a process flow diagram of a method of acquiring customer insight in a retail environment, in accordance with embodiments. The method is generally referred to by the reference number 300 and can be performed by the customer insight system 112 described above. The method 300 can begin at block 302, wherein a product interaction is received from a personal mobile device. As described above, the product interaction may, for example, include a product identifier received from a product tag corresponding to a product located in the retail environment. The product interaction can be initiated by the customer's personal mobile device, for example, by the scanning of a product tag. An application running on the mobile device can respond to the scanning of the tag by sending tag information to the customer insight system 112. Additionally, product interactions can be initiated by the customer requesting information related to a scanned product, or requesting in-store customer service. In some embodiments, the product interaction includes a request for product specifications, product reviews, product offers, and the like. In an embodiment, the product interaction includes a request for in-store customer assistance.

At block 304, the location of the customer within the retail environment can be determined based on the planned location of the product. As discussed above, a product identifier corresponding to the scanned product tag can be used to lookup the planned location of the product in a store planogram accessible through the customer insight system 112.

At block 306, personalization information corresponding to the mobile device can be obtained. The personalization information can be any information known about the user of the mobile device. As discussed above, the personalization information can include previous purchases, previous product interactions initiated by the customer, or other information provided by the customer, such as name, mailing address, billing information, demographics information, brand preferences, likes and dislikes, among others. As discussed above, the personalization information can be included in a user profile stored by the customer insight system 112 or stored to the mobile device and sent to the customer insight system 112 during the product interaction.

At block 308, a business action can be performed based on the product interaction. The business action may be based, at least in part, on the product identifier corresponding to the scanned product tag and included in the product interaction. For example, the business action can include sending information or media content to the personal mobile device related to the scanned product. The business action can also be based on the customer's location. For example, the business action can include dispatching a customer service agent to the customer's location or rendering advertising content on an in-store advertising medium located in the vicinity of the customer's location. The business action can also be based on the personalization information. For example, the business action can provide product information, product offers, or advertising content to the mobile device regarding a product in which the customer might be interested based, for example, on the customer's brand preferences, demographics, or prior product interactions. Further, the business action can be based on the product interactions of a plurality of customers. For example, the business action can include rendering in-store advertising based on product interactions initiated by several customers for the same product.

At block 310, customer insight information corresponding to the product interaction can be stored to a data structure such as the brickstream database 234 shown in FIG. 2. The customer insight information can include various aspects of the product interaction, such as the product scanned, the type of information requested by the customer, product purchase information, and demographic or other personal information about the customer, which may be provided by the user profile.

Figure 4:
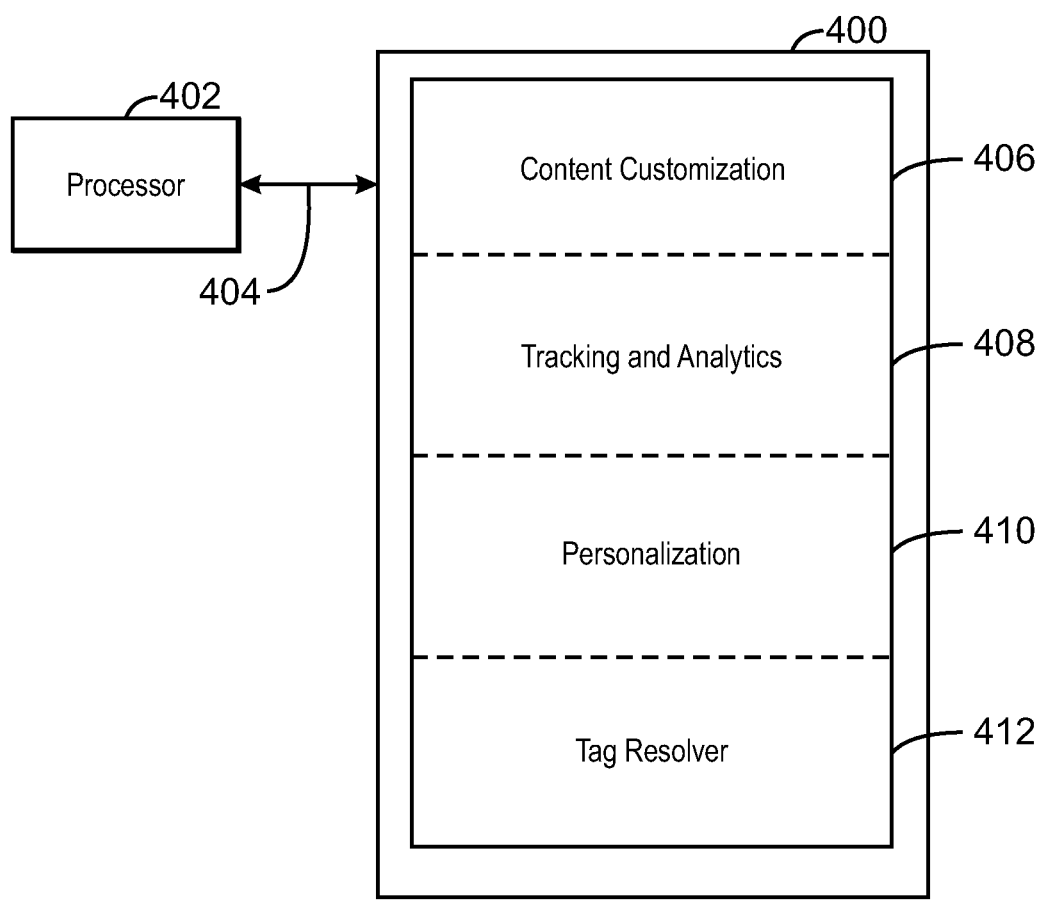
FIG. 4 is a block diagram showing a non-transitory, computer-readable medium that stores code configured to acquire customer insight in a retail environment, in accordance with embodiments.

FIG. 4 is a block diagram showing a non-transitory, computer-readable medium that stores code configured to acquire customer insight in a retail environment, in accordance with embodiment. The non-transitory, computer-readable medium is referred to by the reference number 400. The non-transitory, computer-readable medium 400 can comprise RAM, a hard disk drive, an array of hard disk drives, an optical drive, an array of optical drives, a non-volatile memory, a universal serial bus (USB) drive, a digital versatile disk (DVD), or a compact disk (CD), among others.

As shown in FIG. 4, the various components discussed herein can be stored on the non-transitory, computer-readable medium 400. A first region 406 on the non-transitory, computer-readable medium 400 can include a content customization module configured to receive a product interaction from a personal mobile device, determine a customer location within the retail environment based on a planned location of the product, and perform a business action based, at least in part, on the product interaction. The product interaction can include a product identifier corresponding to a product located in the retail environment. A region 408 can include a tracking and analytics module configured to store customer insight information corresponding to the product interaction to a data structure. A region 410 can include a personalization module configured to receive customer related information, for example, from a user profile. A region 412 can include tag resolver module configured to receive tag information from the mobile device and identify a corresponding product. Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. A computer system that acquires customer insight information in a retail environment, comprising:
    a computing device with a processor that is configured to execute computer-readable instructions; and
    a memory device that stores instructions modules that are executable by the processor, the instructions modules comprising a content customization engine configured to:
        receive, over a wireless communication network, a product interaction from a mobile device of a given customer, the product interaction comprising the mobile device scanning a product identifier corresponding to a product located and being sold in the retail environment, the product identifier comprising a scannable tag on the product;
        determine a planned location of the product within the retail environment by looking up the planned location within a store planogram, electronically stored in a content management system, using the received product identifier;
        determine a customer location of the given customer within the retail environment as the determined planned location of the product; and
        initiate a business action based, at least in part, on the product interaction and the customer location, including:
            cause a hardware display located within the retail environment near the customer location to display information regarding the product, wherein the information is provided by the content customization engine and the hardware display is to play media content, including at least still images, video or audio;
            cause an audio system separate from the display and that is used within the retail environment to make announcements to play further information regarding the product responsive to a plurality of customer-initiated product interactions with the product performed by a plurality of customers, wherein the information is provided by the content customization engine; and
            transmit discount information regarding the product for redemption by the given customer to the mobile device responsive to having received one or more prior product interactions with the product from the mobile device; and
    a tracking and analytics engine configured to store customer insight information corresponding to the product interaction and the customer location to a data structure.

2. The computer system of claim 1, comprising a personalization engine configured to receive a user profile, wherein the business action is based, at least in part, on the user profile.

3. The computer system of claim 2, wherein the user profile is stored to the mobile device and is communicated to the personalization engine as a part of the product interaction.

4. The computer system of claim 2, wherein the user profile comprises at least one of brand preferences, previous product purchases, and customer likes and dislikes.

5. The computer system of claim 1, wherein the content customization engine receives a plurality of product interactions from a plurality of customers and the business action comprises an in-store advertisement corresponding to the plurality of product interactions.

6. The computer system of claim 1, wherein the content customization engine identifies an advertising medium in the vicinity of the customer based on the customer location, and the business action comprises rendering an advertisement corresponding to the product on the advertising medium.

7. The computer system of claim 1, wherein the tracking and analytics engine is configured to analyze customer foot traffic within the retail environment based on product interactions received from a plurality of mobile devices.

8. The computer system of claim 1, wherein the tracking and analytics engine is configured to analyze in-store product interactions to identify a particular product in which a customer has shown an interest but has not purchased.

9. A method of acquiring customer insight information and providing customized content in a retail environment, comprising:
    receiving, by a server over a wireless communication network, a product interaction from a mobile device of a given user, the product interaction comprising the mobile device scanning a product identifier corresponding to a product located and being sold in the retail environment, the product identifier comprising a scannable tag on the product;
    determining, by the server, a planned location of the product within the retail environment by looking up the planned location within a store planogram, electronically stored in a content management system, using the received product identifier;
    determining, by the server, a customer location of the given customer within the retail environment as the determined planned location of the product;
    performing, by the server, a business action based, at least in part, on the product interaction and the customer location, including:
        causing a hardware display located within the retail environment near the customer location to display information regarding the product, where the information is provided by a content customization engine running on the server and the hardware display is to play media content, including at least still images, video, or audio;
        causing an audio system separate from the display and that is used within the retail environment to make announcements to play further information regarding the product responsive to a plurality of customer-initiated product interactions with the product performed by a plurality of customers, wherein the information is provided by the content customization engine; and
        transmitting discount information regarding the product for redemption by the given customer to the mobile device responsive to having received one or more prior product interactions with the product from the mobile device;
    storing customer insight information corresponding to the product interaction and the customer location to a data structure.

10. The method of claim 9, wherein the product interaction comprises a request for at least one of product specifications, product reviews, or product offers.

11. The method of claim 9, wherein the product interaction comprises a request for in-store customer assistance.

12. The method of claim 9, wherein performing a business action comprises sending product related information to the mobile device.

13. The method of claim 9, wherein performing a business action comprises dispatching a customer service agent to the customer location.

14. The method of claim 9, wherein performing a business action comprises sending media content to the mobile device.

15. The method of claim 9, wherein performing a business action comprises rendering advertising content on an in-store advertising medium located in the vicinity of the customer location.

16. The method of claim 9, comprising receiving a user profile from the mobile device, wherein performing the business action is based on the product identifier and the user profile.

17. A non-transitory, computer-readable medium, comprising code configured to direct a processor to acquire customer insight information and provide customized content, the code configured to direct a processor to:
receive, over a wireless communication network, a product interaction from a mobile device of a given customer, the product interaction comprising the mobile device scanning a product identifier corresponding to a product located and being sold in the retail environment, the product identifier comprising a scannable tag on the product;
determine a planned location of the product within the retail environment by looking up the planned location within a store planogram, electronically stored in a content management system, using the received product identifier;
determine a customer location of the given customer within the retail environment as the determined planned location of the product;
perform a business action based, at least in part, on the product interaction and the customer location, including:
causing a hardware display located within the retail environment near the customer location to display information regarding the product, wherein the information is provided by a content customization engine and the hardware display is to play media content, including at least still images, video, or audio;
causing an audio system separate from the display and that is used within the retail environment to make announcements to play further information regarding the product responsive to a plurality of customer-initiated product interactions with the product performed by a plurality of customers, wherein the information is provided by the content customization engine; and
transmitting discount information regarding the product for redemption by the given customer to the mobile device responsive to having received one or more prior product interactions with the product from the mobile device; and
store customer insight information corresponding to the product interaction and the customer location to a data structure.

18. The non-transitory, computer-readable medium of claim 17, wherein the product interaction comprises a request for information corresponding to the product.

19. The non-transitory, computer-readable medium of claim 17, wherein performing the business action comprises sending product related information to the mobile device.

20. The non-transitory, computer-readable medium of claim 17, wherein performing the business action comprises rendering advertising content on an in-store advertising medium located in the vicinity of the customer location.

* * * * *